US008750400B2

(12) United States Patent
Ojard (10) Patent No.: US 8,750,400 B2
(45) Date of Patent: Jun. 10, 2014

(54) METHOD AND SYSTEM FOR AN ITERATIVE MULTIPLE USER MULTIPLE INPUT MULTIPLE OUTPUT (MU-MIMO) COMMUNICATION SYSTEM

(75) Inventor: Eric Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 574 days.

(21) Appl. No.: 12/834,455

(22) Filed: Jul. 12, 2010

(65) Prior Publication Data

US 2011/0164699 A1  Jul. 7, 2011

Related U.S. Application Data

(60) Provisional application No. 61/291,957, filed on Jan. 4, 2010.

(51) Int. Cl.
*H04B 7/02* (2006.01)
(52) U.S. Cl.
USPC .......................................... 375/267; 375/260
(58) Field of Classification Search
USPC ....................................................... 375/267
See application file for complete search history.

(56) References Cited

U.S. PATENT DOCUMENTS

| 6,370,129 | B1 * | 4/2002 | Huang | 370/329 |
| 6,873,606 | B2 * | 3/2005 | Agrawal et al. | 370/310 |
| 6,934,323 | B2 * | 8/2005 | Hara | 375/152 |
| 7,092,452 | B2 * | 8/2006 | Taylor et al. | 375/267 |
| 7,526,708 | B2 * | 4/2009 | Tirkkonen et al. | 714/751 |
| 7,551,698 | B2 * | 6/2009 | Ketchum et al. | 375/343 |
| 7,590,204 | B2 * | 9/2009 | Monsen | 375/350 |
| 8,019,016 | B1 * | 9/2011 | Lee et al. | 375/299 |
| 8,081,692 | B1 * | 12/2011 | Zhang et al. | 375/260 |
| 8,103,312 | B2 * | 1/2012 | Khojastepour | 455/562.1 |
| 8,111,771 | B2 * | 2/2012 | Fujii | 375/267 |

(Continued)

FOREIGN PATENT DOCUMENTS

EP  2034682 A2  3/2009

OTHER PUBLICATIONS

Multiuser Downlink MIMO Beamforming Using an Iterative Optimization Approach Sharma, V.; Lambotharan, S.; Vehicular Technology Conference, 2006. VTC-2006 Fall. 2006 IEEE 64th Digital Object Identifier: 10.1109/VTCF.2006.77 Publication Year: 2006, pp. 1-5.

(Continued)

*Primary Examiner* — Santiago Garcia
(74) *Attorney, Agent, or Firm* — Garlick & Markison; Bruce E. Garlick (57) ABSTRACT

A method and system for an iterative multiple user multiple input multiple output (MU-MIMO) communication system are presented. In one aspect, a current iteration beamforming matrix may be generated based on a current iteration matched filter matrix for each of a plurality of user devices. A subsequent iteration matched filter matrix may be generated based on the current iteration beamforming matrix for each of the plurality of user devices. A subsequent iteration beamforming matrix may be generated based on the subsequent iteration matched filter matrix for each of the plurality of user devices. A succeeding iteration beamforming matrix may be generated based on an iteration count value and/or based on one or more difference values. The one or more difference values may be computed based on the plurality of subsequent iteration beamforming matrices and the plurality of current iteration beamforming matrices generated for the plurality of user devices.

20 Claims, 3 Drawing Sheets

(56) References Cited

U.S. PATENT DOCUMENTS

| | | | |
|---|---|---|---|
| 8,249,659 B2* | 8/2012 | Khojastepour | 455/561 |
| 2003/0100343 A1* | 5/2003 | Zourntos et al. | 455/562 |
| 2004/0165684 A1* | 8/2004 | Ketchum et al. | 375/343 |
| 2007/0098106 A1* | 5/2007 | Khojastepour et al. | 375/267 |
| 2007/0155336 A1* | 7/2007 | Nam et al. | 455/69 |
| 2007/0191066 A1* | 8/2007 | Khojastepour et al. | 455/562.1 |
| 2007/0297526 A1* | 12/2007 | Ketchum et al. | 375/260 |
| 2008/0316099 A1* | 12/2008 | Fujii | 342/373 |
| 2009/0015472 A1* | 1/2009 | Lozano | 342/367 |
| 2009/0046009 A1* | 2/2009 | Fujii | 342/373 |
| 2009/0066577 A1* | 3/2009 | Kim et al. | 342/373 |
| 2009/0080579 A1* | 3/2009 | Fujii | 375/347 |
| 2009/0093222 A1* | 4/2009 | Sarkar | 455/115.1 |
| 2009/0147728 A1* | 6/2009 | Atia et al. | 370/321 |
| 2009/0316760 A1* | 12/2009 | Phillips | 375/147 |
| 2011/0164578 A1* | 7/2011 | Kim et al. | 370/329 |
| 2011/0176633 A1* | 7/2011 | Ojard et al. | 375/295 |
| 2011/0194649 A1* | 8/2011 | Khojastepour | 375/296 |
| 2011/0211547 A1* | 9/2011 | Kim et al. | 370/329 |
| 2011/0223928 A1* | 9/2011 | Seo et al. | 455/452.1 |
| 2011/0268209 A1* | 11/2011 | Khojastepour | 375/267 |
| 2011/0268210 A1* | 11/2011 | Khojastepour | 375/267 |
| 2011/0268211 A1* | 11/2011 | Khojastepour | 375/267 |
| 2011/0268212 A1* | 11/2011 | Khojastepour | 375/267 |
| 2011/0268213 A1* | 11/2011 | Khojastepour | 375/267 |
| 2011/0268214 A1* | 11/2011 | Khojastepour | 375/267 |
| 2011/0268215 A1* | 11/2011 | Khojastepour | 375/267 |
| 2011/0268224 A1* | 11/2011 | Khojastepour | 375/295 |
| 2012/0027111 A1* | 2/2012 | Vook et al. | 375/267 |
| 2012/0063336 A1* | 3/2012 | Shany et al. | 370/252 |

OTHER PUBLICATIONS

European Patent Office; European Search Report; EP Application No. 10016177.7; Jan. 9, 2014; pp. 1-3.

Wrycza, et al.; On Convergence Properties of Joint Optimal Power Control and Transmit-Receive Beamforming in Multi-User MIMO Systems; IEEE 7th Workshop on Signal Processing Advances in Wireless Communications, SPAWC '06; Jul. 2-5, 2006; pp. 1-5.

Chang, et al.; Joint transmitter receiver diversity for efficient space division multiaccess; IEEE Transactions on Wireless Communications; Jan. 2002; pp. 16-21; vol. 1, iss 1.

* cited by examiner

METHOD AND SYSTEM FOR AN ITERATIVE MULTIPLE USER MULTIPLE INPUT MULTIPLE OUTPUT (MU-MIMO) COMMUNICATION SYSTEM

CROSS-REFERENCE TO RELATED APPLICATIONS/INCORPORATION BY REFERENCE

This application makes reference to, claims priority to, and claims the benefit of U.S. Provisional Application Ser. No. 61/291,957 filed Jan. 4, 2010, which is hereby incorporated herein by reference in its entirety.

FIELD OF THE INVENTION

Certain embodiments of the invention relate to communication networks. More specifically, certain embodiments of the invention relate to a method and system for an iterative multiple user multiple input multiple output (MU-MIMO) communication system.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Single user MIMO (SU-MIMO) systems enable high speed wireless communications by concurrently transmitting multiple data streams using a plurality of NTX transmitting antennas at a transmitting station. The concurrently transmitted data streams may be received at a receiving station using a plurality of NRX receiving antennas. The Shannon capacity refers to a measure of the maximum data rate for communications between the transmitting station and the receiving station. In SU-MIMO systems, Shannon capacity may be achieved by closed-loop beamforming, link adaptation and/or successive interference cancellation (SIC) techniques.

In comparison to SU-MIMO systems, with MU-MIMO systems, a transmitting station may concurrently transmit multiple data streams, using a plurality of NTX transmitting antennas, which may be concurrently received by multiple receiving stations, where each of the receiving stations may utilize NRX receiving antennas. MU-MIMO systems may support the concurrent transmission of a larger number of data streams, using a larger number of transmitting antennas, relative to SU-MIMO systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for an iterative multiple user multiple input multiple output (MU-MIMO) communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an iterative multiple user multiple input multiple output (MU-MIMO) communication system. Various embodiments of the invention may enable an increase in data rate capacity for communications in MU-MIMO systems by utilizing an iterative method for generating beamforming matrices and corresponding matched filter matrices for each of a plurality user devices in a MU-MIMO system. A current iteration beamforming matrix may be generated based on a current iteration matched filter matrix for each of the plurality of user devices in the MU-MIMO system. A subsequent iteration matched filter matrix may be generated based on the current iteration beamforming matrix for each of the plurality of user devices. A subsequent iteration beamforming matrix may be generated based on the subsequent iteration matched filter matrix for each of the plurality of user devices. A succeeding iteration beamforming matrix may be generated based on an iteration count value and/or based on one or more difference values. The one or more difference values may be computed based on the plurality of subsequent iteration beamforming matrices and the plurality of current iteration beamforming matrices generated for the plurality of user devices. In an exemplary embodiment of the invention, a transmitting station, such as an access point (AP) or base station, may utilize the beamforming matrices to generate concurrently transmitted signals, which may be concurrently transmitted to the plurality of user devices. In various embodiments of the invention, the beamforming matrices may enable an increase in the data rate capacity for the communication channel utilized for communications in the MU-MIMO communication system relative to alternative approaches.

Figure 1:
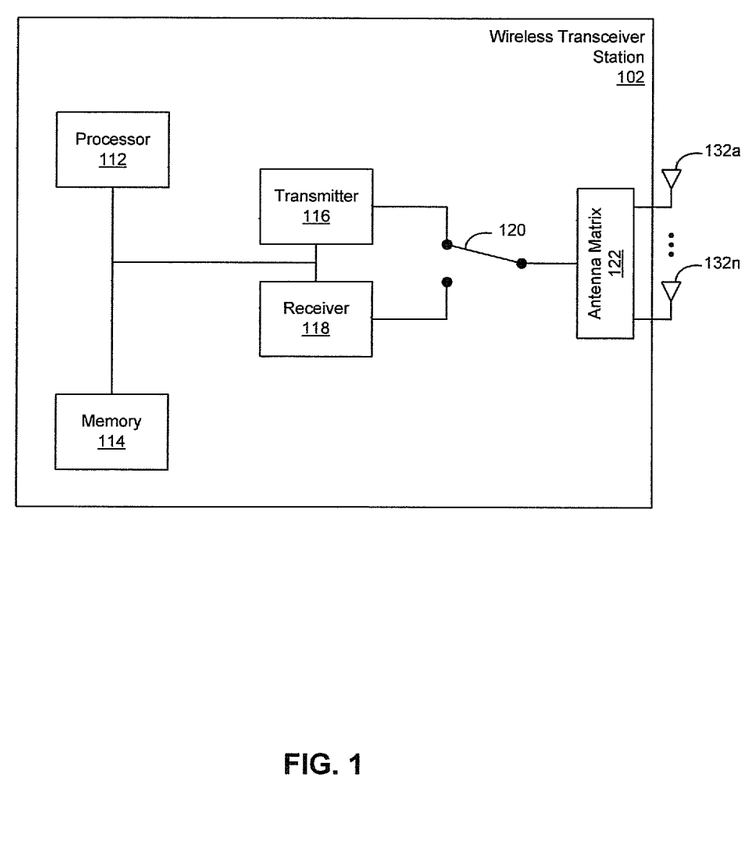
FIG. 1 is a block diagram of an exemplary MIMO transceiver, which may be utilized in connection with an embodiment of the invention.

FIG. 1 is a block diagram of an exemplary MIMO transceiver, which may be utilized in connection with an embodiment of the invention. Referring to FIG. 1, there is shown a wireless transceiver station 102 and a plurality of antennas 132a . . . 132n. The wireless transceiver station 102 is an exemplary wireless communication device, which may be utilized at an access point (AP) device and/or at a station (STA) device (e.g., a client station or mobile user device) in a wireless communication system. The plurality of antennas 132a . . . 132n may enable the wireless transceiver station 102 to transmit and/or receive signals, for example radio frequency (RF) signals, via a wireless communication medium.

The wireless transceiver station 102 shown in FIG. 1 may also be depicted as comprising one or more transmitting antennas, which are coupled to the transmitter 116 and one or more receiving antennas, which may be coupled to the receiver 118 without loss of generality.

The exemplary wireless transceiver station comprises a processor 112, a memory 114, a transmitter 116, a receiver 118, a transmit and receive (T/R) switch 120 and an antenna matrix 122. The antenna matrix 122 may enable selection of one or more of the antennas 132a . . . 132n for transmitting and/or receiving signals at the wireless transceiver station 102. The T/R switch 120 may enable the antenna matrix 122 to be communicatively coupled to the transmitter 116 or receiver 118. When the T/R switch 120 enables communicative coupling between the transmitter 116 and the antenna matrix 122, the selected antennas 132a . . . 132n may be utilized for transmitting signals. When the T/R switch 120 enables communicative coupling between the receiver 118 and the antenna matrix 122, the selected antennas 132a . . . 132n may be utilized for receiving signals.

The transmitter 116 may enable the generation of signals, which may be transmitted via the selected antennas 132a . . . 132n. The transmitter 116 may generate signals by performing coding functions, signal modulation and/or signal modulation. In various embodiments of the invention, the transmitter 116 may enable generation of signals using precoding and/or beamforming techniques.

The receiver 118 may enable the processing of signals received via the selected antennas 132a . . . 132n. The receiver 118 may generate data based on the received signals by performing signal amplification, signal demodulation and/or decoding functions. In various embodiments of the invention, the receiver 118 may enable generation of data, which may be utilized by the transmitter 116 for precoding and/or beamforming of generated signals.

The processor 112 may enable the generation of transmitted data and/or the processing of received data. The processor 112 may generate data, which is utilized by the transmitter 116 to generate signals. The processor 112 may process data generated by the receiver 118. In various embodiments of the invention, in a node B, the processor 112 may process data received by the receiver 118 and generate coefficient data, which may be utilized by the transmitter 116 for precoding and/or beamforming of generated signals. The coefficient data may be stored in the memory 114.

In various embodiments of the invention, in an AP or base station, the processor 112 may be operable to iteratively compute a plurality of beamforming matrices and/or corresponding matched filter matrices. The processor 112 within the AP or base station may compute the beamforming matrices and/or matched filter matrices based on signals and/or feedback information received from one or more STAs (e.g., client stations or mobile user devices). The beamforming matrices and/or matched filter matrices may be stored in the memory 114. The matched filter matrices may be sent to the transmitter 116 by the processor 112 or the matched filter matrices may be retrieved from the memory 114 by the transmitter 116. The transmitter 116 may utilize the beamforming matrices to generate signals to communicate the matched filter matrices to the STAs. The generated signals may be concurrently transmitted via the transmitting antennas 132a . . . 132n.

Figure 2:
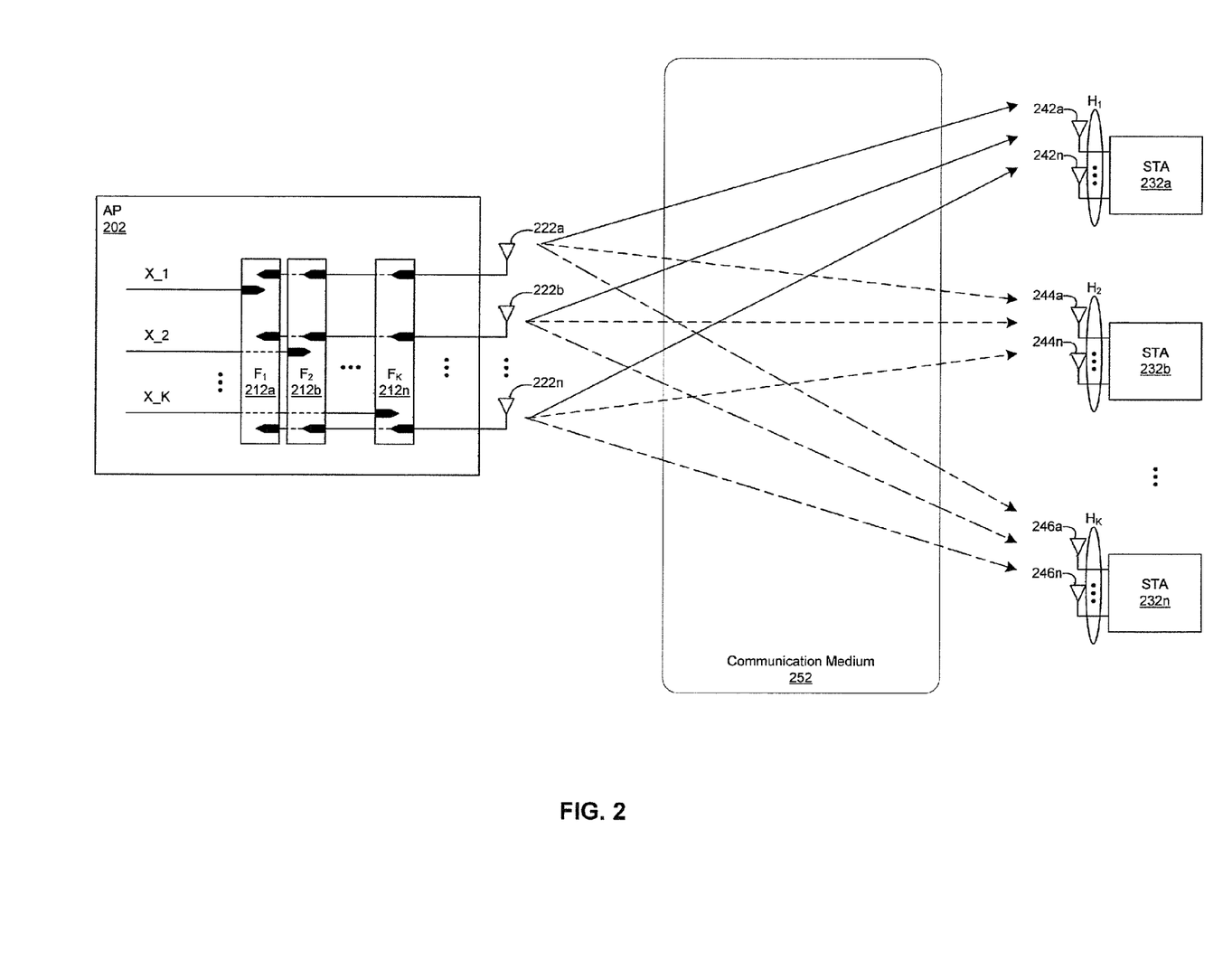
FIG. 2 is a block diagram of an exemplary multiple user MIMO system, which may be utilized in connection with an embodiment of the invention.

FIG. 2 is a block diagram of an exemplary multiple user MIMO system, which may be utilized in connection with an embodiment of the invention. Referring to FIG. 2, there is shown an AP 202 with a plurality of transmitting antennas 222a, 222b, . . . , 222n, a STA 232a with a plurality of antennas 242a . . . 242n, a STA 232b with a plurality of antennas 244a . . . 244n, a STA 232n with a plurality of antennas 246a . . . 246n, and a communication medium 252. The number of STAs 232a, 232b, . . . , 232n may be represented by the quantity K. The antennas 242a . . . 242n, 244a . . . 244n and/or 246a . . . 246n may be utilized for transmission and/or reception of signals at STA 232a, 232b and 232n, respectively. The number of antennas at a STA i may be represented by the quantity M(i). The AP 202 may comprise a plurality of beamformer blocks $F_1$ 212a, $F_2$ 212b and $F_K$ 212n. The number of transmitting antennas 222a, 222b, . . . , 222n may be represented by the quantity N.

In an exemplary embodiment of the invention, the AP 202 may concurrently transmit a plurality of K sets data streams, $X_1, X_2, \ldots, X_K$. In an exemplary embodiment of the invention, each data stream set $X_i$ may represent a plurality of L(i) data streams. As shown in FIG. 2, each set data streams may be input to a corresponding one of the beamformer blocks. For example, as shown in FIG. 2, data stream set $X_1$ is coupled as an input to beamformer block $F_1$ 212a, data stream set $X_2$ is coupled as an input to beamformer block $F_2$ 212b, . . . , data stream set $X_K$ is coupled as an input to beamformer block $F_K$ 212n. Each of the beamformer blocks 212a, 212b, . . . , 212n may be coupled to the plurality of transmitting antennas 222a, 222b, . . . , 222n. Each of the beamforming blocks 212a, 212b, . . . , 212n may utilize corresponding beamforming matrices, $F_1, F_2, \ldots, F_K$, to generate a plurality of transmit chain signals, which are concurrently transmitted via the plurality of N transmitting antennas 222a, 222b, . . . , 222n. The transmitted signals may propagate across the communication medium 252. In an exemplary embodiment of the invention, the AP 202 may concurrently transmit signals generated from a plurality of $$\sum_{i=1}^{K} L(i)$$

data streams. In various embodiments of the invention, $$N \geq \sum_{i=1}^{K} L(i).$$

In an exemplary embodiment of the invention, the concurrently transmitted signals from AP 202 may propagate across the communication medium 252 to be received via the plurality of M(i) antennas 242a, . . . , 242n at the STA 232a. The communication channel from the AP 202 to the STA 232a may be characterized by a channel estimate matrix $H_1$, which is based on the signals concurrently transmitted by the plurality of N transmitting antennas and received via the plurality of M(i) receiving antennas. The concurrently transmitted signals from the AP 202 may propagate across the communication medium 252 to be received via the plurality of M(i) antennas 244a, . . . , 244n at the STA 232b. The communication channel from the AP 202 to the STA 232b may be characterized by a channel estimate matrix $H_2$. The concurrently transmitted signals from the AP 202 may propagate across the communication medium 252 to be received via the plurality of M(i) antennas 246a, . . . , 246n at the STA 232n. The communication channel from the AP 202 to the STA 232n may be characterized by a channel estimate matrix $H_K$. In various embodiments of the invention, $M(i) \geq L(i)$.

In an exemplary embodiment of the invention, each of the STAs may utilize a corresponding matched filter matrix, $W_i$, to selectively receive a corresponding one of the K sets of data streams, $X_1, X_2, \ldots, X_K$. For example, the STA 232a may utilize a matched filter matrix $W_1$, to selectively receive data stream set $X_1$, the STA 232b may utilize a matched filter matrix $W_2$, to selectively receive data stream set $X_2, \ldots$, the STA 232n may utilize a matched filter matrix $W_K$, to selectively receive data stream set $X_K$.

Various embodiments of the invention comprise an iterative procedure for computing the beamforming matrices $F_1$, $F_2, \ldots, F_K$, and matched filter matrices $W_1, W_2, \ldots, W_K$, to maximize the aggregate capacity of the communication channels that are characterized by channel estimate matrices $H_1$, $H_2, \ldots, H_K$.

The communication system illustrated in FIG. 2 may be represented as shown in the following equation:

$$\begin{pmatrix} R_1 \\ \vdots \\ R_K \end{pmatrix} = \begin{pmatrix} H_1 \\ \vdots \\ H_k \end{pmatrix} \begin{pmatrix} F_1 & \ldots & F_k \end{pmatrix} \begin{pmatrix} X_1 \\ \vdots \\ X_K \end{pmatrix} + \begin{pmatrix} n_1 \\ \vdots \\ n_K \end{pmatrix} \quad [1]$$

$$\begin{pmatrix} R_1 \\ \vdots \\ R_K \end{pmatrix} = \begin{pmatrix} H_1 F_1 & \ldots & H_1 F_K \\ \vdots & \ddots & \vdots \\ H_K F_1 & \ldots & H_K F_K \end{pmatrix} \begin{pmatrix} X_1 \\ \vdots \\ X_K \end{pmatrix} + \begin{pmatrix} n_1 \\ \vdots \\ n_K \end{pmatrix} \quad [2]$$

where $R_1 \ldots R_K$ represent received signal vectors of signals received at each corresponding STA, $H_1 \ldots H_K$ represent channel estimate matrices associated with the communication channels from AP 202 to each corresponding STA, $F_1 \ldots F_K$ represent beamforming matrices associated with corresponding beamforming blocks 212a, 212b, ..., 212n located at the AP 202, $X_1 \ldots X_K$ represent data vectors for each of the plurality of spatial stream sets generated at the AP 202 and $n_1 \ldots n_K$ represent noise vectors for channel noise associated with the communication medium 252.

Referring to equation [1], and in an exemplary embodiment of the invention in which AP 202 comprises N transmitting antennas and generates a plurality of K data vectors, each of which comprises L(i) data streams, and in an exemplary MU-MIMO communication system in which there is a plurality of K STAs, each of which utilizes a plurality of M(i) antennas, each of the received signal vectors $R_i$ comprise M(i) rows and 1 column, each of the channel estimate matrices $H_i$ comprise M(i) rows and N columns, each of the beamforming matrices $F_i$ comprise N rows and L(i) columns, each of the data vectors $X_i$ comprise L(i) rows and 1 column and each of the noise vectors $n_i$ comprise M(i) rows and 1 column. Referring to equation [2], each of the off-diagonal matrix elements ($H_i F_j$, for $i \neq j$) correspond to interference signals at the STAs. For example, for the STA 232a, the received signal vector $R_1$ may be represented as shown in the following equation:

$$= R_1 = H_1 F_1 X_1 + H_1 F_2 X_2 + \ldots + H_1 F_K X_K \quad [3]$$

In equation [3], the signal component transmitted by the AP 202 for reception by the STA 232a is represented by the term $H_1 F_1 X_1$, while the remaining signal components in equation [3], $H_1 F_j X_j$ (where $j \neq 1$), represent interference signals that are received by the STA 232a. The interference signals represented in equation [3] correspond to signals transmitted by the AP 202 for reception by other STAs, which are received by the STA 232a.

Each of the STAs may utilize matched filters to filter interference signals, such as those shown in equation [3]. In an exemplary embodiment of the invention, each of the STAs may utilize a corresponding matched filter, which may be represented by corresponding matched filter matrices, $W_i$, as shown in the following equation:

$$\begin{pmatrix} W_1 R_1 \\ \vdots \\ W_K R_K \end{pmatrix} = \begin{pmatrix} W_1 H_1 F_1 & \ldots & W_1 H_1 F_K \\ \vdots & \ddots & \vdots \\ W_K H_K F_1 & \ldots & W_K H_K F_K \end{pmatrix} \begin{pmatrix} X_1 \\ \vdots \\ X_K \end{pmatrix} + \begin{pmatrix} W_1 n_1 \\ \vdots \\ W_K n_K \end{pmatrix} \quad [4]$$

Referring to equation [4], and in an exemplary embodiment of the invention in which each of the plurality of K STAs utilize a plurality of M(i) antennas and receive a plurality if L(i) data streams, each of the matched filter matrices $W_i$ comprise L(i) rows and M(i) columns. Accordingly, each of the filtered signal vectors $W_i R_i$ comprise L(i) rows and 1 column. Each of the off-diagonal matrix elements ($W_i H_i F_j$, for $i \neq j$) correspond to filtered interference signals at the STAs. For example, for the STA 232a, the filtered signal vector $W_i R_i$ may be represented as shown in the following equation:

$$W_1 R_1 = W_1 H_1 F_1 X_1 + W_1 H_1 F_2 X_2 + \ldots + W_1 H_1 F_K X_K \quad [5]$$

In equation [5], the desired signal component is represented by the term $W_1 H_1 F_1 X_1$, while the remaining signal components in equation [5], $W_1 H_1 F_j X_j$ (where $j \neq 1$), represent interference signals. The capacity, $C_1$, for the communication channel characterized by channel estimate matrix $H_1$, may be maximized when the matched filter matrix $W_1$ successfully suppresses the interference signal components in equation [3]. Referring to equation [5], this condition may occur when:

$$W_1 H_1 F_2 X_2 + \ldots + W_1 H_1 F_K X_K \cong 0 \quad [6]$$

Various embodiments of the invention may comprise an iterative procedure for computing beamforming matrices, $F_1 \ldots F_K$, and matched filter matrices, $W_1 \ldots W_K$, such that the aggregate capacity, C, of the channels $C_i$ (for $i = 1, 2, \ldots, K$) is maximized. The aggregate capacity, C, may be represented as shown in the following equation:

$$C = \sum_{i=1}^{K} C_i \quad [7]$$

where $C_i$ represents the capacity of the channel characterized by the channel estimate matrix $H_i$. Each capacity value $C_i$ may be represented as shown in the following equation:

$$C_i = \log_2(det(I + F_i^H H_i^H D_i^{-1} H_i F_i)) \quad [8]$$

where:

$$D_i = H_i \left( \sum_{k \neq i} F_k F_k^H \right) H_i^H + I\sigma^2 \quad [9]$$

where i represents a user index corresponding to one of the plurality of K STAs 232a, 232b, ..., 232n, matrix $A^H$ represents a complex conjugate (or Hermitian) transpose version of matrix A, matrix $A^{-1}$ represents an inverse version of matrix A, matrix I represents an identity matrix and $\sigma^2$ represents noise power at each receiving antenna in the MU-MIMO system. In various embodiments of the invention, noise power corresponds to an additive white Gaussian noise (AWGN).

Referring to equation [8], various embodiments of the invention comprise an iterative procedure for computing beamforming matrices $F_i$ to maximize the capacity values $C_i$.

Figure 3:
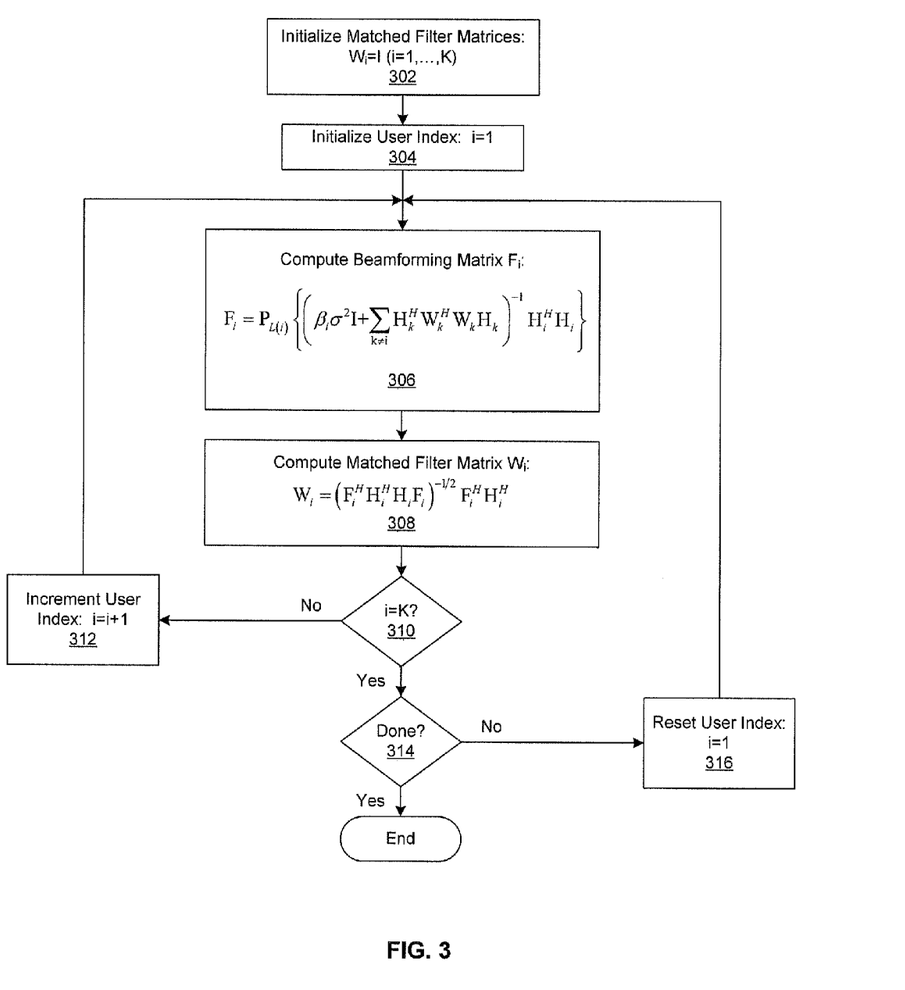
FIG. 3 is a flowchart that illustrates exemplary steps for iterative computation of beamforming matrices, in accordance with an embodiment of the invention.

FIG. 3 is a flowchart that illustrates exemplary steps for iterative computation of beamforming matrices, in accordance with an embodiment of the invention. Referring to FIG. 3, in step 302, each of the matched filter matrices $W_i$ is initialized to be equal to an identity matrix. In step 304, the user index is initialized to a value i=1. In step 306, the iterative loop begins with the computation of the beamforming matrix $F_i$, as shown in the following equation:

$$F_i = P_{L(i)}\left\{\left(\beta_i\sigma^2 I + \sum_{k \neq i} H_k^H W_k^H W_k H_k\right)^{-1} H_i^H H_i\right\} \quad [10]$$

where L(i) represents the number of spatial streams received by the $i^{th}$ user, $\beta_i$ represents a noise scaling factor for the receive antennas for the $i^{th}$ user and $P_{L(i)}\{X\}$ represents a matrix that comprises L(i) eigenvectors, which correspond to the L(i) largest eigenvalues associated with the matrix X. In various embodiments of the invention, $\beta_i=1$. In other exemplary embodiments of the invention, $$\beta_i = \sum_{i=1}^{K} L(i).$$

In various embodiments of the invention, L(i)≤M(i).

Following the computation of the beamforming matrix $F_i$ in step 306, in step 308, a corresponding matched filter matrix $W_i$ may be computed as shown in the following equation:

$$W_i = (F_i^H H_i^H H_i F_i)^{-1/2} F_i^H H_i^H \quad [11]$$

Step 310 may determine whether the last of the user iterations i=1, ..., K has been completed. If i<K at step 310, the last iteration has not been completed and in step 312, the user index is incremented i=i+1. Step 306 follows step 312 and beamforming and matched filter matrices are computed for the next user. If i=K at step 310, then at step 314, a determination is made whether the iterative process has been completed. In various embodiments of the invention, the completion determination may be made at step 314 based on the number of instances that step 314 is reached during the iterative process (for example, in embodiments of the invention where the iterative process comprises a determined number of iterations). In other exemplary embodiments of the invention, the completeness determination may be made at step 314 based on changes in the one or more values $F_i$ ($\Delta F_i$) during previous iterations (for example, in embodiments of the invention where the iterative process is complete when the value $\Delta F_i$ becomes less than a threshold value). If at step 314, the iterative process has not completed, in step 316, the user index value is reset to i=1.

Step 306 follows step 316 and beamforming and matched filter matrices are computed for the first user based on previously computed matched filter matrices $W_i$. If at step 314, the iterative process is determined to have completed, the computed beamforming matrices, $F_1, \ldots, F_K$, may be utilized by the AP 202 to generate subsequent concurrently transmitted signals, while each of the STAs 232a, 232b, ..., 232n may utilize a corresponding one of the plurality of computed matched filter matrices $W_K$, to selectively receive the subsequent concurrently transmitted signals.

In various embodiments of a method and system for an iterative MU-MIMO communication system, a processor 112 utilized in connection with an AP 202 may compute, for a plurality of user devices STA 232a, 232b and 232c in a MU-MIMO communication system, a current beamforming matrix, $F_i$ (where i represents an index value for each of the plurality of user devices), based on a current matched filter matrix, $W_i$, and a channel noise value, $\beta_i\sigma^2$. A plurality of subsequent matched filter matrices, $W_i'$, may be computed based on the current beamforming matrices $F_i$. A subsequent beamforming matrix, $F_i'$, may be computed based on the subsequent matched filter matrix, $W_i'$, and the channel noise value, for each of the plurality of user devices.

The channel noise value, $\beta_i\sigma^2$, may be computed for each of the plurality of user devices based on a channel noise scaling factor, $\beta_i$. Each of the matrices, $F_i$, $F_i'$, $W_i$, and/or $W_i'$, for each of the plurality of user devices, may comprise a plurality of eigenvectors. The processor 112 may compute each of the matrices $F_i$, $F_i'$, $W_i$ and/or $W_i'$, based on a channel estimate matrix, $H_i$, for each of the plurality of user devices. A succeeding matched filter matrix, $W_i''$, may be computed based on the subsequent beamforming matrix, $F_i'$, for each of the plurality of user devices. A succeeding beamforming matrix, $F_i''$, may be computed based on, the succeeding matched filter matrix, $W_i''$, and the channel noise value, $\beta_i\sigma^2$, for each of the plurality of user devices. In an exemplary embodiment of the invention, the succeeding beamforming matrix for each of the plurality of user devices, $F_i''$, may be computed based on an iteration count value. A beamforming matrix and matched filter matrix may be computed for each of the plurality of user devices during a given iteration. The iteration count value may be incremented for each successive iteration. In other exemplary embodiments of the invention, the succeeding beamforming matrix for each of the plurality of user devices, $F_i''$, may be computed based on a difference value, $\Delta_i$, where $\Delta_i = F_i'' - F_i'$. An aggregate channel capacity value for the MU-MIMO communication system may be computed based on the current beamforming matrices computed for the plurality of users as shown in equations [7]-[9].

In various embodiments of the invention, the channel noise value may be computed based on one or more noise power values, $\sigma^2$, as measured at one or more of the plurality of K STAs 232a, 232b, ..., 232n, in the MU-MIMO system. For example, a given STA in the MU-MIMO system may measure a noise power value, $\sigma_i^2$, based on signals received at the given STA. The given STA may communicate the measured noise power value via feedback information to the AP 202. The AP 202 may determine a channel noise value $\beta_i\sigma_i^2$ for an $i^{th}$ STA in the MU-MIMO system based on the received feedback information. The beamforming matrix $F_i$ may be computed based on the corresponding channel noise value $\beta_i\sigma_i^2$.

In various embodiments of the invention, the channel noise value may be determined based on a modulation and coding scheme (MCS) corresponding one or more users in the MU-MIMO system. A given MCS may comprise a selected one or more modulation types and/or a selected one or more coding rates. A given $MCS_i$ may correspond to an $i^{th}$ ST As in the MU-MIMO system. Based on the given $MCS_i$ a corresponding channel noise value $\beta_i\sigma_i^2$ may be computed for the $i^{th}$ STAs in the MU-MIMO system. In an exemplary embodiment of the invention, the channel noise value, $\beta_i\sigma_i^2$, may be selected from a lookup table (LUT) based on the given $MCS_i$, wherein the $MCS_i$ is utilized as an index value to select an individual entry from the LUT. The beamforming matrix $F_i$ may be computed based on the corresponding channel noise value $\beta_i\sigma_i^2$.

In various embodiments of the invention, the channel noise value may be determined based on one or more measured path loss values. In an exemplary embodiment of the invention, a given STA in the MU-MIMO system may measure one or more path loss values based on signals received by at given STA. The given STA may communicate the measured path loss value via feedback information to the AP 202. The AP 202 may compute a channel noise value $\beta_i \sigma_i^2$ for an $i^{th}$ STA in the MU-MIMO system based on the received feedback information. The beamforming matrix $F_i$ may be computed based on the corresponding channel noise value $\beta_i \sigma_i^2$.

In various other embodiments of the invention, the AP may measure one or more path loss values based on signals received from the $i^{th}$ STA in the MU-MIMO system. The AP 202 may compute a channel noise value $\beta_i \sigma_i^2$ for an $i^{th}$ STA in the MU-MIMO system based on the measured one or more path loss values. The beamforming matrix $F_i$ may be computed based on the corresponding channel noise value $\beta_i \sigma_i^2$.

In various embodiments of the invention, each STA among the plurality of K STAs in the MU-MIMO system may correspond to one or more users. An exemplary user may be an operator of a STA.

Another embodiment of the invention may provide a computer readable medium, having stored thereon, a computer program having at least one code section executable by a computer, thereby causing the computer to perform the steps as described herein for an iterative multiple user multiple input multiple output (MU-MIMO) communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:

initializing current matched filter matrices for a plurality of users in a multiple user multiple input multiple output communication system:

for the plurality of users:

selecting one of the plurality of users;

generating a current beamforming matrix for the selected one of the plurality of users based on one or more current matched filter matrices for at least a portion of remaining ones of the plurality of users and a channel noise value for the selected one of the plurality of users; and generating a subsequent matched filter matrix for the selected one of the plurality of users based on the current beamforming matrix; and generating one or more subsequent beamforming matrices for the plurality of users based on one or more of the subsequent matched filter matrices and the channel noise value, wherein a number of the one or more subsequent beamforming matrices is determined based on an iteration count value corresponding to completion criteria.

2. The method according to claim 1, comprising generating each of the current beamforming matrix, the subsequent beamforming matrix and/or the subsequent matched filter matrix based on a channel estimate matrix for the selected one of the plurality of users.

3. The method according to claim 1, comprising determining a number of the one or more subsequent beamforming matrices based on a determined difference value, wherein the difference value is based on the current beamforming matrix and the subsequent beamforming matrix.

4. The method according to claim 1, comprising computing the channel noise value based on the or more measured noise power values.

5. The method according to claim 4, comprising receiving the one or more measured noise power values via feedback information.

6. The method according to claim 1, comprising determining the channel noise value based on a selected one or more modulation types and/or a selected one or more coding rates.

7. The method according to claim 6, comprising determining the channel noise value from a lookup table based on the selected one or more modulation types and/or the selected one or more coding rates.

8. The method according to claim 1, comprising computing the channel noise value based on one or more measured path loss values.

9. The method according to claim 8, comprising receiving the one or more measured path loss values via feedback information.

10. A system for processing signals, the system comprising:

one or more circuits that enable initializing current matched filter matrices for a plurality of users in a multiple user multiple input multiple output communication system;

the one or more circuits enable;

selecting one of the plurality of users;

generating a current beamforming matrix for the selected one of the plurality of users based on one or more current matched filter matrices for at least a portion of remaining ones of the plurality of users and a channel noise value for the selected one of the plurality of users; and generating a subsequent matched filter matrix for the selected one or the plurality of users based on the current beamforming matrix; and the one or more circuits enable generation of one or more subsequent beamforming matrices for the plurality of users based on one or more of the subsequent matched filter matrices and the channel noise value, wherein a number of the one or more subsequent beamforming matrices is determined based on an iteration count value corresponding to completion criteria.

11. The system according to claim 10, wherein the one or more circuits enable generation of each of the current beamforming matrix, the subsequent beamforming matrix and/or the subsequent matched filter matrix based on a channel estimate matrix for the selected one of the plurality of users.

12. The system according to claim 10, wherein the one or more circuits enable determination of a number of the one or more subsequent beamforming matrices based on a determined difference value, wherein the difference value is based on the current beamforming matrix and the subsequent beamforming matrix.

13. The system according to claim 10, wherein the one or more circuits enable computation of the channel noise value based on one or more measured noise power values.

14. The system according to claim 13, wherein the one or more circuits enable reception of the one or more measured noise power values via feedback information.

15. The system according to claim 10, wherein the one or more circuits enable determination of the channel noise value based on a selected one or more modulation types and/or a selected one or more coding rates.

16. The system according to claim 15, wherein the one or more circuits enable determination of the channel noise value from a lookup table based on the selected one or more modulation types and/or the selected one or more coding rates.

17. The system according to claim 10, wherein the one or more circuits enable computation of the channel noise value based on one or more measured path loss values.

18. The system according to claim 17, wherein the one or more circuits enable reception of the one or more measured path loss values via feedback information.

19. A method for processing signals, the method comprising:
  initializing current matched filter matrices for a plurality of users in a multiple user multiple input multiple output communication system:
  for the plurality of users:
    selecting one of the plurality of users;
    generating a current beamforming matrix for the selected one of the plurality of users based on one or more current matched filter matrices for at least a portion of remaining ones of the plurality of users and a channel noise value for the selected one of the plurality of users; and
    generating a subsequent matched filter matrix for the selected one of the plurality of users based on the current beamforming matrix; and
  generating one or more subsequent beamforming matrices for the plurality of users based on one or more of the subsequent matched filter matrices and the channel noise value, wherein a number of the one or more subsequent beamforming matrices based on a determined difference value, wherein the difference value is based on the current beamforming matrix and the subsequent beamforming matrix.

20. The system according to claim 19, wherein the one or more circuits enable computation of the channel noise value based on one or more measured noise power values.

* * * * *

UNITED STATES PATENT AND TRADEMARK OFFICE
CERTIFICATE OF CORRECTION

Page 1 of 1

PATENT NO. : 8,750,400 B2
APPLICATION NO. : 12/834455
DATED : June 10, 2014
INVENTOR(S) : Eric Ojard It is certified that error appears in the above-identified patent and that said Letters Patent is hereby corrected as shown below:

In the Claims

Col. 10, line 66, in claim 10: replace "one or the plurality" with --one of the plurality--

Signed and Sealed this
Seventeenth Day of March, 2015

Michelle K. Lee
*Director of the United States Patent and Trademark Office*